United States Patent
Kunitachi et al.

(10) Patent No.: US 10,527,466 B2
(45) Date of Patent: Jan. 7, 2020

(54) INSTRUMENT CLUSTER

(71) Applicants: DENSO International America, Inc., Southfield, MI (US); DENSO CORPORATION, Kariya-shi, Aichi-ken (JP)

(72) Inventors: Ryo Kunitachi, Novi, MI (US); Brandon Peterson, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 255 days.

(21) Appl. No.: 15/009,918

(22) Filed: Jan. 29, 2016

(65) Prior Publication Data
US 2017/0219392 A1   Aug. 3, 2017

(51) Int. Cl.
*G01D 13/22*   (2006.01)
*F21V 8/00*    (2006.01)

(52) U.S. Cl.
CPC ............ *G01D 13/22* (2013.01); *G02B 6/005* (2013.01)

(58) Field of Classification Search
CPC .... G01D 13/22; G02B 6/005; G02B 27/0172; G02B 27/68; G02B 27/0088; G02F 1/1368

USPC ............................................. 362/23.2, 23.01
See application file for complete search history.

(56) References Cited

U.S. PATENT DOCUMENTS

| 4,218,726 | A  | * | 8/1980 | Fukasawa | G01D 11/28 116/288 |
| 2005/0162843 | A1 | * | 7/2005 | Lee | G01D 13/265 362/23.2 |
| 2009/0180272 | A1 | * | 7/2009 | Tsurumi | B60K 35/00 362/23.16 |
| 2010/0188835 | A1 | * | 7/2010 | Kato | G01D 11/28 362/23.2 |
| 2012/0120345 | A1 | * | 5/2012 | Takato | B60K 37/02 349/62 |

FOREIGN PATENT DOCUMENTS

JP    2013057568 A    3/2013

* cited by examiner

*Primary Examiner* — Anh T Mai
*Assistant Examiner* — Jessica M Apenteng
(74) *Attorney, Agent, or Firm* — Harness, Dickey & Pierce, P.L.C.

(57) ABSTRACT

An instrument cluster assembly including a display screen having a backlight. A pointer is movable to point to different portions of an instrument cluster gauge in order to convey information to a driver or operator. A light guide is included with the pointer. The light guide is configured to receive light from the backlight of the display screen, and illuminate the pointer.

16 Claims, 3 Drawing Sheets

INSTRUMENT CLUSTER

FIELD

The present disclosure relates to an instrument panel cluster.

BACKGROUND

This section provides background information related to the present disclosure, which is not necessarily prior art.

Instrument clusters are often used with vehicles or other machinery to convey information to a driver or operator of the machinery. For example, instrument clusters are often used to convey vehicle speed, engine speed, engine temperature, fuel level, engine oil level, etc. Instrument clusters often include one or more pointer needles, which are movable to point to different portions of a meter or gauge in order to convey information to the driver/operator. The pointer needles are often illuminated, such as when vehicle headlights are activated, in order to enhance visibility of the pointer needle when the vehicle is being operated at night. While current instrument clusters are suitable for their intended use, they are subject to improvement. The present teachings provide improved instrument cluster assemblies, which address numerous needs in the art and provide various advantages, as described herein and as one skilled in the art will recognize.

SUMMARY

This section provides a general summary of the disclosure, and is not a comprehensive disclosure of its full scope or all of its features.

The present teachings provide for an instrument cluster assembly including a display screen having a backlight. A pointer is movable to point to different portions of an instrument cluster gauge in order to convey information to a driver or operator. A light guide is included with the pointer. The light guide is configured to receive light from the backlight of the display screen, and illuminate the pointer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
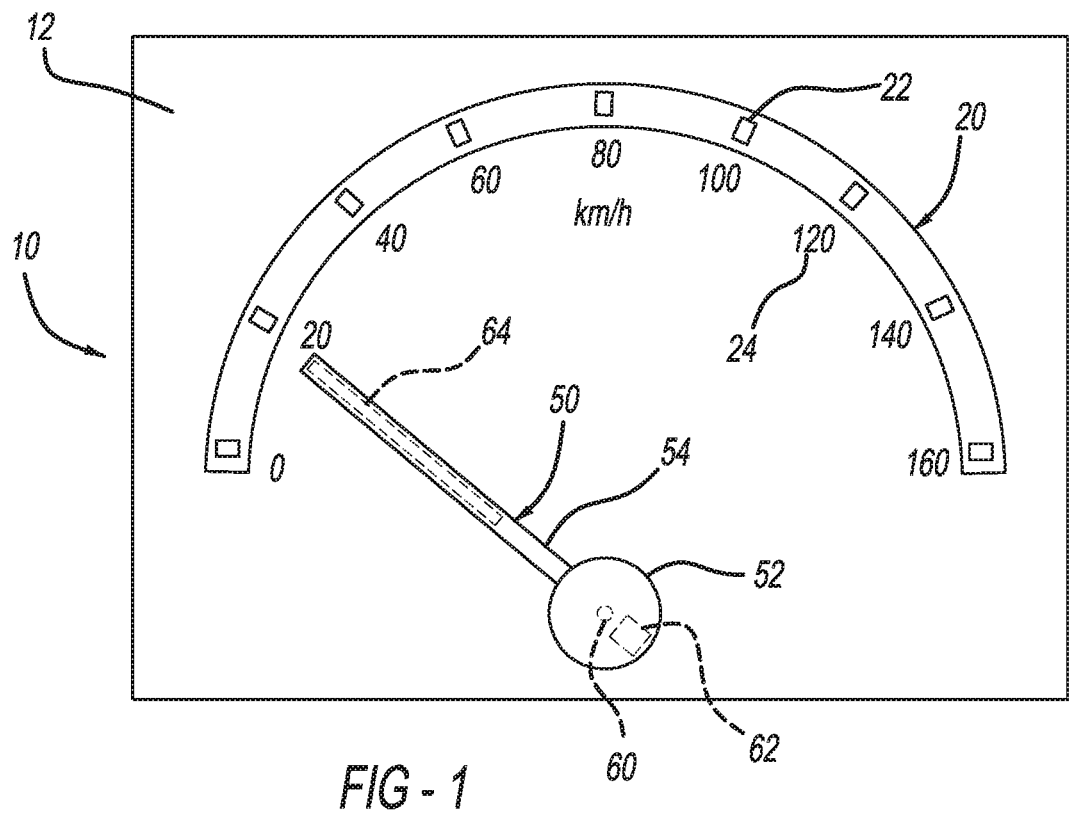
FIG. 1 is a plan view of an instrument cluster assembly according to the present teachings.

With initial reference to FIG. 1, an instrument cluster assembly according to the present teachings is illustrated at reference numeral 10. The instrument cluster assembly 10 generally includes a display screen 12, a gauge 20, and a pointer 50. The display screen 12 can be any suitable type of electronic display screen, such as a thin film transistor (TFT) display. The gauge 20 includes a plurality of tick marks or accents 22, which are spaced apart about the gauge 20 and aligned with numerals 24. There may be more (or less) tick marks 22 than numerals 24. In some applications, there may be no numerals 24, only tick marks 22. The pointer 50 is movable, such as rotatably movable, to point to any one of the tick marks 22 and numerals 24, or any portion of the gauge 20 therebetween.

The gauge 20 can be configured to convey any suitable type of information to the driver/operator. For example, when the gauge 20 is included with a vehicle instrument cluster, the gauge 20 can be configured as any one of a speedometer, engine speed gauge, fuel level gauge, engine temperature gauge, engine oil level gauge, etc. The numerals 24 may be printed on the instrument cluster assembly 10 in any suitable manner, or be displayed by the display screen 12. When the numerals 24 are displayed by the display screen 12, the display screen 12 can readily change the numerals 24 that are displayed in order change the type of gauge 20 displayed. For example, the driver/operator can change the gauge 20 from a speedometer to a tachometer according to driver preference.

Although the instrument cluster assembly 10 is described herein as a vehicle instrument cluster assembly. The instrument cluster assembly 10 can be used with any other type of equipment or machinery, such as generators, building HVAC systems, security systems, military systems, or any other suitable equipment. With respect to vehicles, the instrument cluster assembly 10 can be used with any suitable vehicle, such as a passenger vehicle, motorcycle, mass transit vehicle, watercraft, aircraft, construction equipment, military vehicle, etc.

The pointer 50 generally includes a hub 52 and a needle 54 extending from the hub 52. With additional reference to FIG. 2, the hub 52 is rotatable by a post 56, which extends from, and is rotated by, a motor 58. The post 56 extends through an opening 60 defined in the display 12, and supports the hub 52 over the display screen 12.

Figure 2:
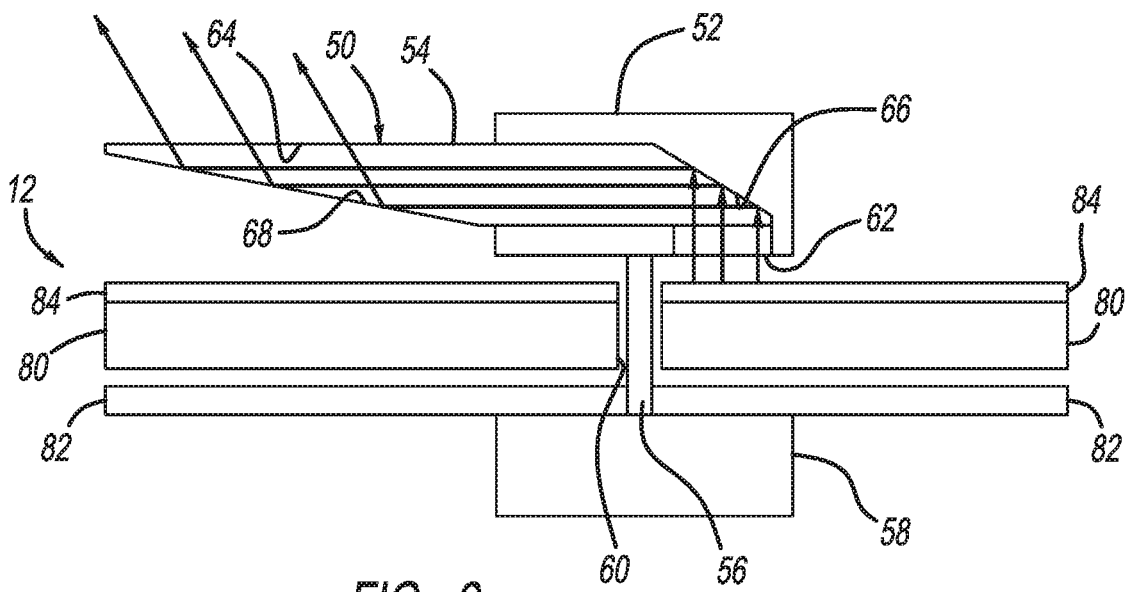
FIG. 2 is a cross-sectional view of an instrument cluster assembly according to the present teachings.

The pointer 50 includes a light guide, which has a light receiving or pickup portion 62, and an illuminated indicator portion 64. The light pickup portion 62 is arranged on an inner surface of the hub 52, which faces the display screen 12. The illuminated indicator portion 64 is arranged along a length of the needle 54. As illustrated in FIG. 2, for example, the light pickup portion 62 receives light from the display 12, which is reflected off of a first angled reflective surface 66 to a second angled reflective surface 68, and off the second angled reflective surface 68 to the illuminated indicator portion 64. To reflect light from the first angled reflective surface 66 along the length of the pointer 50 to the second angled reflective surface 68, and to the illuminated indicator portion 64, the angle of refraction of the first and second angled reflective surfaces 66 and 68 is sufficient for total internal reflection to occur, and/or at least the first and the second angled reflective surfaces 66 and 68 can be coated with a suitable reflective material. Thus the pointer 50 and the illuminated indicator portion 64 thereof is advantageously illuminated by the display screen 12, and particularly a backlight 80 of the display screen 12.

The display screen 12 is any suitable display screen, and as illustrated in FIG. 2 can include a printed circuit board (PCB) 82, which is on a side of the backlight 80 opposite to the pointer 50. Between the backlight 80 and the pointer 50 is a thin film transistor (TFT) layer 84. The TFT layer 84 can be any suitable display screen layer configured to generate text, images, and/or colored light generally when illuminated by the backlight 80. As illustrated in FIG. 2, the TFT layer 84 is arranged on top of the backlight 80 on a side of the backlight 80 facing the pointer 50. The TFT layer 84 extends across the backlight 80 so as to be between the light pickup portion 62 of the light guide and the backlight 80. Thus in the configuration of FIG. 2, light from the backlight 80 passes through the TFT 84 before being picked up or received by the light pickup portion 62. As a result, the TFT 84 can change the color of light passing into the light pickup portion 62 from the backlight 80, thereby modifying the color of light emitted at the illuminated indicator portion 64 of the pointer 50.

Illuminating the pointer 50 with light from the backlight 80 of the display screen 12 provides numerous advantages. For example, using the backlight 80 eliminates the need for a separate light source for illuminating the pointer 50, thereby simplifying the instrument cluster assembly 10 and reducing the assembly time and overall cost of the instrument cluster assembly 10. Furthermore, the color of light emitted at the illuminated indicator portion 64 can be regularly and easily changed using color filters included with the TFT layer 84.

Figure 3:
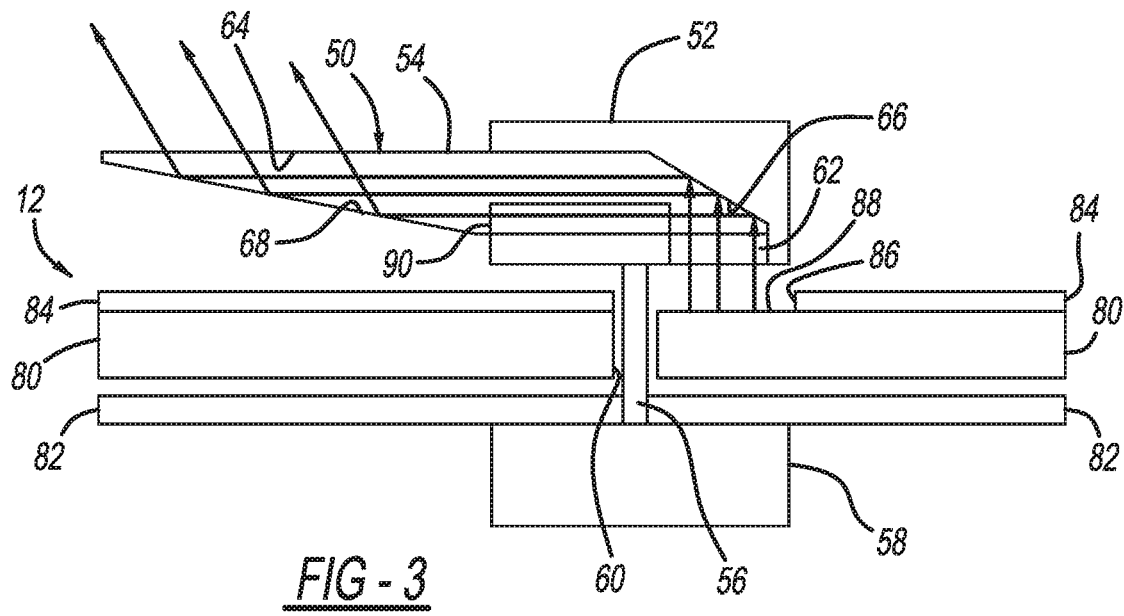
FIG. 3 is a cross-sectional view of another instrument cluster assembly according to the present teachings.

With reference to FIG. 3, the TFT layer 84 need not extend to cover the portion of the backlight 80 opposite to the light pickup portion 62. For example, edge 86 of the TFT layer 84 can be arranged spaced apart from the opening 60 so as to provide exposed portion 88 of the backlight 80 opposite to the light pickup portion 62. Therefore, light from the backlight 80 enters the light pickup portion 62 without passing through the TFT layer 84. As a result, the intensity of light emitted by the backlight 80 is not decreased as a result of passing through the TFT layer 84, which will advantageously result in the light emitted at the illuminated indicator portion 64 having a greater intensity than light from the backlight 80 that passes through the TFT layer 84 prior to reaching the light pickup portion 62, as illustrated in FIG. 2.

With continued reference to FIG. 3, a color filter 90 may be provided within the pointer 50. Light reflecting off of the first angled reflective surface 66 contacts the color filter 90 to color the light with a color corresponding to the color filter 90. The color filter 90 thus advantageously allows light emitted at the illuminated indicator portion 64 to be colored, eventhough the light does not pass through the TFT layer 84 prior to reaching the pointer 50.

Figure 4:
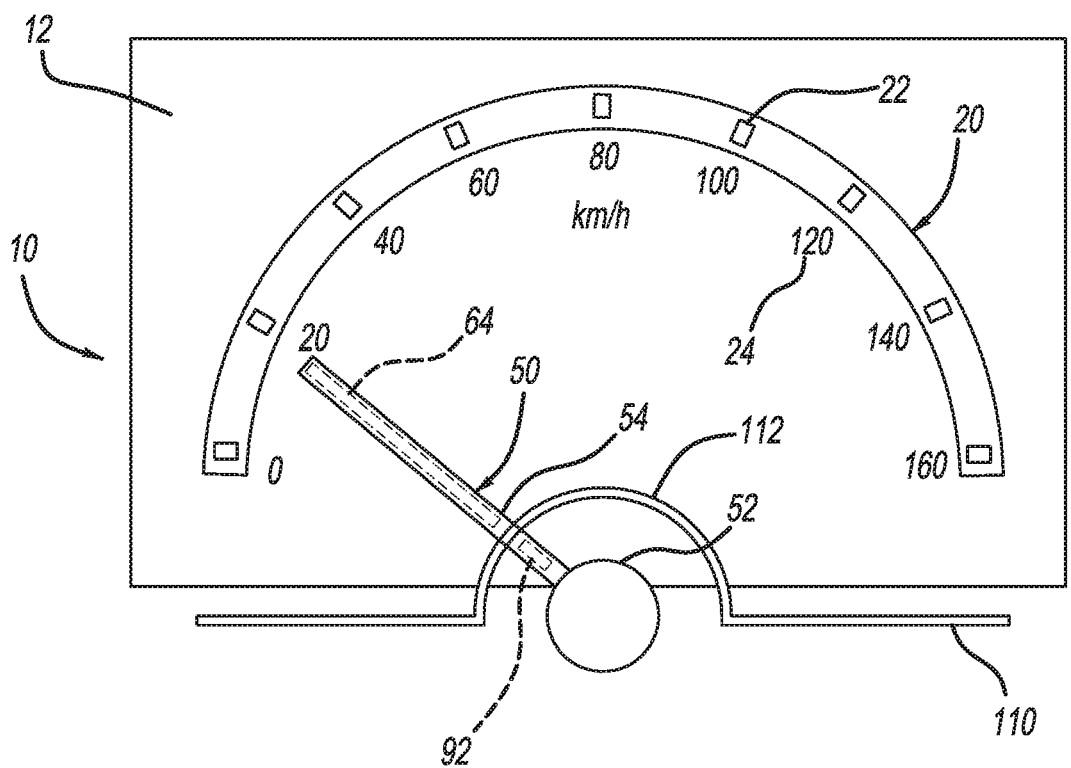
FIG. 4 is a plan view of an additional instrument cluster assembly according to the present teachings.

With reference to FIG. 4, the pointer 50 can be arranged such that the hub 52 is generally offset from the display screen 12 so as to only partially overlap, or not overlap, the display screen 12. This eliminates the need to provide the opening 60 in the display 12 to accommodate the post 56. Because the hub 52 is offset from the display screen 12, the light pickup portion 62 is not included with the hub 52. Instead, the light guide includes a light pickup portion 92 arranged along a portion of the needle 54 overlapping the display screen 12. The light pickup portion 92 is substantially similar to, or the same as, the light pickup portion 62, and is thus configured to receive light from the backlight 80 and direct the light to the angled surface 66 of the needle 54, and ultimately to the illuminated indicator portion 64.

Figure 5:
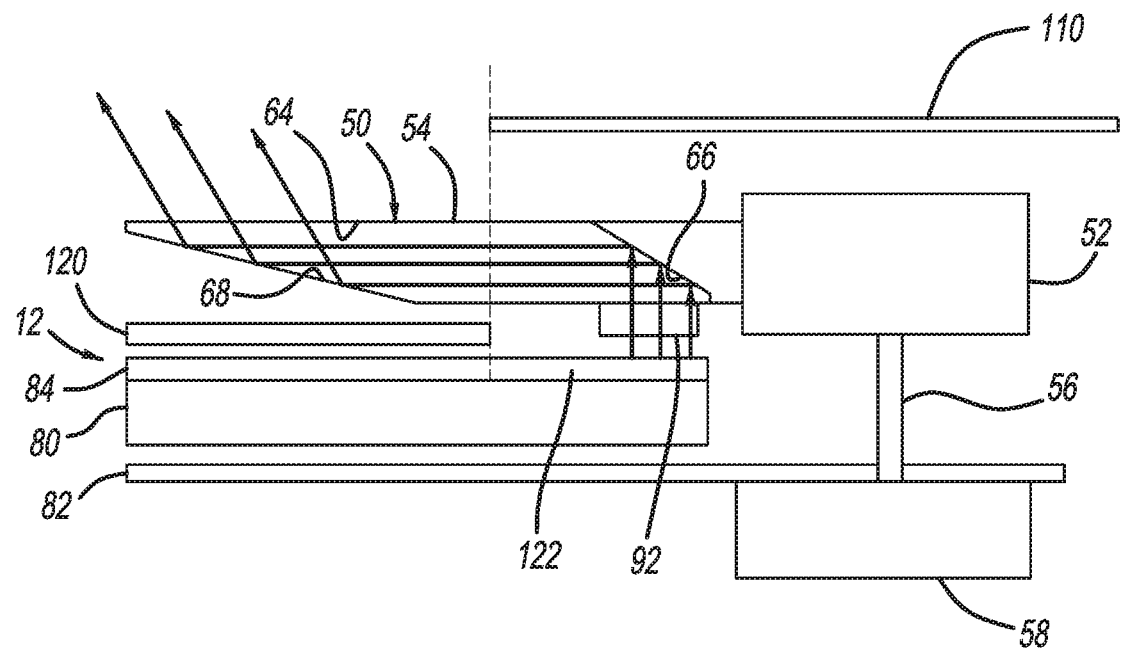
FIG. 5 is a cross-sectional view of the instrument cluster assembly of FIG. 4.

With reference to FIGS. 4 and 5, the instrument cluster assembly 10 can include a visor 110. The visor 110 is provided, for example, to cover and house various components of the instrument cluster assembly 10. The visor 110 includes a protruding portion 112, which can overlap the display screen 12, as illustrated in FIG. 4. The light pickup portion 92 and the illuminated indicator portion 64 can be arranged on opposite sides of the protruding portion 112 of the visor 110, with the light pickup portion 92 being arranged closer to the hub 52 than the illuminated indicator portion 64. The light pickup portion 92 can be arranged opposite to TFT layer 84, and thus light from the backlight 80 passes through the TFT layer 84 prior to reaching the light guide 92. The TFT layer 84 can therefore advantageously be used to change the color of light passing into the light pickup portion 92.

With reference to FIG. 5, the TFT layer 84 can be alternatively arranged so that it terminates prior to reaching the area of the backlight 80 that is opposite to the light pickup portion 92. With such a configuration, a colored insert 122 can be arranged over the backlight 80 opposite to the light pickup portion 92, or within the pointer 50 as illustrated in FIG. 3 with color filter 90, in order to change the color of light passing to the light pickup portion 92 from the backlight 80.

With continued reference to FIG. 5, a darkened or opaque layer 120 can be arranged between the display screen 12 and the pointer 50. For example, the opaque layer 120 can be arranged between the TFT layer 84 and the pointer 50. The opaque layer 120 can be of any suitable degree of transparency, ranging from nontransparent, to semitransparent, to completely transparent. The opaque layer 120 can be made of any suitable material, and can include any suitable coating, configured to provide the opaque layer 120 with a desired degree of transparency. The opaque layer 120 advantageously restricts passage of light therethrough from the backlight 80 in order to darken areas of the display screen 12 beneath the needle 54 of the pointer 50, thereby making the light emitted at the illuminated indicator portion 64 more visible and appear more intense.

Figure 6:
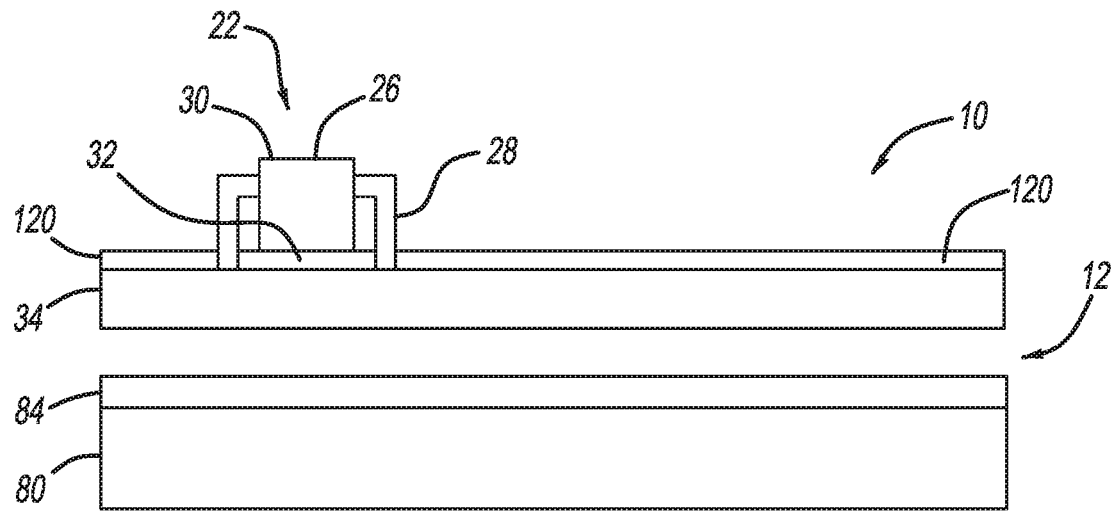
FIG. 6 is a cross-sectional view of an instrument cluster assembly gauge portion according to the present teachings.

With reference to FIG. 6, the tick mark 22, as well as any of the other tick marks 80, includes a light guide 26 mounted over the display 12 by support members 28 such that the tick mark 22 is illuminated by the backlight 80 of the display screen 12. The support members 28 support the light guide 26 and advantageously prevent light from escaping from the sides thereof, thereby directing light to an outermost portion 30 of the light guide 26, which is opposite to the display screen 12. The light guide 26 can be arranged on a color filter 32 in order to modify the color of light extending to the light guide 26 from the backlight 80. The color filter 32 can be seated on a polycarbonate sheet 34 or any other suitable layer of the instrument cluster assembly 10. The polycarbonate sheet 34 can be arranged over the TFT layer 84. An opaque layer 120 can be seated on the polycarbonate sheet 34 spaced apart from the color filter 32 and outboard of the support member 28. The support member 28 can be mounted to the polycarbonate sheet 34 or any other suitable portion of the instrument cluster assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An instrument cluster assembly comprising:
   a liquid crystal display screen including a backlight;
   a pointer movable to point to different portions of a gauge, the pointer includes a hub portion, a needle portion extending from the hub portion, and a post extending from the hub portion through an opening defined by the liquid crystal display screen to a motor that rotates the pointer by rotating the post, a rotational axis of the pointer extends along the post and through the hub portion; and
   a light guide included with the pointer, the light guide configured to receive light from the backlight of the liquid crystal display screen and illuminate the pointer, the light guide includes a first angled reflective surface and a second angled reflective surface, the first angled reflective surface reflects light from the backlight to the second angled reflective surface, the second angled reflective surface reflects light outward from the pointer to illuminate the pointer, the first angled reflective surface is included with the hub portion, the second angled reflective surface is included with the needle portion such that the second angled reflective surface is radially outward of the hub portion, the first angled reflective surface is spaced apart from the second angled reflective surface;
   wherein the hub portion includes a light pickup portion of the light guide that overlaps the liquid crystal display screen throughout a rotational range of motion of the pointer.

2. The instrument cluster assembly of claim 1, wherein the liquid crystal display screen is a thin film transistor liquid crystal display screen.

3. The instrument cluster assembly of claim 1, wherein the pointer overlaps the liquid crystal display screen.

4. The instrument cluster assembly of claim 1, wherein the needle portion of the pointer extends from the hub portion and includes an illuminated indicator portion of the light guide.

5. The instrument cluster assembly of claim 1,
   wherein the needle portion includes an illuminated indicator portion of the light guide configured to emit light received by the light pickup portion of the light guide.

6. The instrument cluster assembly of claim 1, wherein the light guide includes a color filter configured to color light received by the light pickup portion of the light guide from the backlight of the liquid crystal display screen.

7. The instrument cluster assembly of claim 1, further comprising an at least partially opaque layer that is arranged between the liquid crystal display screen and the needle portion of the pointer extending from the hub portion of the pointer.

8. The instrument cluster assembly of claim 1, wherein the light pickup portion is opposite to and overlaps both the backlight and a thin film transistor (TFT) layer of the liquid crystal display screen, the TFT layer is between the backlight and the light pickup portion of the light guide.

9. The instrument cluster assembly of claim 1, wherein the gauge includes a plurality of spaced apart tick marks that the pointer is configured to point to, each one of the tick marks including a tick mark light guide and a least one support member supporting the tick mark light guide;

wherein the tick mark light guide is configured to receive light from the backlight of the liquid crystal display screen to illuminate the tick mark.

10. An instrument cluster assembly comprising:

a liquid crystal display screen including a backlight;

a pointer movable to point to different portions of a gauge, the pointer includes a hub portion, a needle portion extending from the hub portion, and a post extending from the hub portion through an opening defined by the liquid crystal display screen to a motor that rotates the pointer by rotating the post, a rotational axis of the pointer extends along the post and through the hub portion;

a pointer light guide included with the pointer, the pointer light guide configured to receive light from the backlight of the liquid crystal display screen and illuminate the pointer, the pointer light guide includes a first angled reflective surface and a second angled reflective surface, the first angled reflective surface reflects light from the backlight to the second angled reflective surface, the second angled reflective surface reflects light outward from the pointer to illuminate the pointer, the first angled reflective surface is included with the hub portion, the second angled reflective surface is included with the needle portion such that the second angled reflective surface is radially outward of the hub portion, the first angled reflective surface is spaced apart from the second angled reflective surface; and a plurality of indicators spaced apart about the gauge, each one of the plurality of indicators is configured to be illuminated by the backlight, the pointer is movable to point to the plurality of indicators;

wherein the hub portion includes a light pickup portion of the pointer light guide that overlaps the liquid crystal display screen throughout a rotational range of motion of the pointer.

11. The instrument cluster assembly of claim 10, wherein the liquid crystal display screen is a thin film transistor liquid crystal display screen.

12. The instrument cluster assembly of claim 10, the needle portion including an illuminated indicator portion of the pointer light guide configured to emit light received at the light pickup portion.

13. The instrument cluster assembly of claim 10, further comprising an at least partially opaque layer between the liquid crystal display screen and the pointer, the at least partially opaque layer is not arranged between the backlight and the light pickup portion of the pointer light guide.

14. The instrument cluster assembly of claim 10, further comprising a thin film transistor layer of the liquid crystal display screen arranged between the light pickup portion of the pointer light guide and the backlight.

15. The instrument cluster assembly of claim 10, wherein between at least one of the plurality of indicators and the display is a color filter.

16. The instrument cluster assembly of claim 10, wherein each one of the plurality of indicators is supported by support members extending from the liquid crystal display screen.

\* \* \* \* \*